(12) United States Patent
McBride et al.

(10) Patent No.: US 11,390,154 B2
(45) Date of Patent: Jul. 19, 2022

(54) ELECTRIC MOTOR-GENERATOR IN A VEHICLE SYSTEM AND METHOD FOR OPERATION OF SAID MOTOR-GENERATOR

(71) Applicant: Ford Global Technologies, LLC, Dearborn, MI (US)

(72) Inventors: Thomas Russell McBride, Livonia, MI (US); Megan Mackenzie Gould, Plymouth, MI (US); Duane Allan Lewis, Westland, MI (US); Jason Michael Sanderson, Farmington Hills, MI (US); Brandon David Lint, Dexter, MI (US); James Trent, South Lyon, MI (US); Brian Richard Light, Flat Rock, MI (US); Eric Pavlov, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 16/706,216

(22) Filed: Dec. 6, 2019

(65) Prior Publication Data

US 2021/0170854 A1 Jun. 10, 2021

(51) Int. Cl.
| | | |
|---|---|---|
| B60K 6/26 | (2007.10) |
| B60K 6/387 | (2007.10) |
| B60K 6/48 | (2007.10) |
| B60K 6/40 | (2007.10) |
| B60K 6/24 | (2007.10) |
| B60K 6/36 | (2007.10) |

(52) U.S. Cl.
CPC .............. *B60K 6/26* (2013.01); *B60K 6/24* (2013.01); *B60K 6/36* (2013.01); *B60K 6/387* (2013.01); *B60K 6/40* (2013.01); *B60K 6/48* (2013.01)

(58) Field of Classification Search
CPC ... B60K 6/24; B60K 6/26; B60K 6/38; B60K 6/387; B60K 6/40; B60K 6/48
See application file for complete search history.

(56) References Cited

U.S. PATENT DOCUMENTS

| | | | | |
|---|---|---|---|---|
| 5,789,823 A * | 8/1998 | Sherman | ................ | B60K 6/383 290/47 |
| 6,474,428 B1 * | 11/2002 | Fujikawa | ............... | B60K 6/383 180/65.25 |
| 6,492,742 B1 * | 12/2002 | Fujikawa | ................ | B60K 6/26 290/40 C |

(Continued)

FOREIGN PATENT DOCUMENTS

| | | |
|---|---|---|
| DE | 19962507 A1 | 12/2000 |
| WO | 2012164568 A1 | 12/2012 |

*Primary Examiner* — Jeffrey J Restifo
(74) *Attorney, Agent, or Firm* — David Kelley; McCoy Russell LLP

(57) ABSTRACT

Methods and systems for an electric motor-generator in a vehicle are provided. In one example, an electric motor-generator is provided that includes an engine interface configured to rotationally couple to a first engine, a transmission interface configured to rotationally couple to a first transmission of the first engine, and a rotor with a plurality of magnets at least partially surrounding a stator including a plurality of coils. The rotor is rotationally coupled to the engine interface and the transmission interface.

14 Claims, 5 Drawing Sheets

(56) References Cited

U.S. PATENT DOCUMENTS

| | | | | |
|---|---|---|---|---|
| 6,585,066 B1* | 7/2003 | Koneda | B60K 6/48 | 180/65.25 |
| 6,628,021 B2* | 9/2003 | Shinohara | B60K 6/40 | 310/68 B |
| 8,167,062 B2* | 5/2012 | Wolff | H02K 7/1815 | 180/65.21 |
| 9,550,412 B2* | 1/2017 | Bowdich | H02K 7/003 | |
| 10,760,624 B1* | 9/2020 | Samie | F16H 41/04 | |
| 2006/0289209 A1* | 12/2006 | Grosspietsch | B60K 6/26 | 180/65.25 |
| 2011/0259698 A1* | 10/2011 | Arnold | B60K 6/405 | 192/48.1 |
| 2013/0192945 A1* | 8/2013 | Frait | B60K 6/405 | 192/3.21 |
| 2013/0192946 A1* | 8/2013 | Frait | B60K 6/387 | 192/3.21 |
| 2013/0192949 A1* | 8/2013 | Frait | F16H 57/0476 | 192/85.63 |
| 2014/0123807 A1* | 5/2014 | Frait | F16H 57/027 | 74/661 |
| 2014/0124318 A1* | 5/2014 | Frait | F16D 25/06 | 192/3.28 |
| 2014/0124321 A1* | 5/2014 | Frait | B60K 6/405 | 192/66.3 |
| 2014/0128219 A1* | 5/2014 | Frait | B60K 6/48 | 477/5 |
| 2015/0114779 A1* | 4/2015 | Frait | B60K 6/26 | 192/3.25 |
| 2015/0114780 A1* | 4/2015 | Frait | B60K 6/40 | 192/3.25 |
| 2015/0114787 A1* | 4/2015 | Brevick | B60K 6/26 | 192/66.32 |
| 2018/0178778 A1* | 6/2018 | Lahr | F16H 45/02 | |
| 2019/0168731 A1* | 6/2019 | Lee | B60L 50/16 | |
| 2019/0178356 A1* | 6/2019 | Vanni | F16H 57/0476 | |
| 2019/0226550 A1* | 7/2019 | Weber | F16F 15/12353 | |
| 2019/0375286 A1* | 12/2019 | Lahr | B60K 6/387 | |
| 2020/0040976 A1* | 2/2020 | Steiner | B60K 6/48 | |
| 2020/0208723 A1* | 7/2020 | Velthaus | F16H 41/30 | |
| 2020/0247229 A1* | 8/2020 | Riedisser | B60K 6/38 | |
| 2020/0290447 A1* | 9/2020 | Samie | B60K 6/48 | |
| 2020/0324755 A1* | 10/2020 | Lahr | F16H 29/02 | |
| 2020/0325970 A1* | 10/2020 | Lahr | F16H 61/143 | |
| 2021/0009104 A1* | 1/2021 | Li | B60W 10/026 | |
| 2021/0025490 A1* | 1/2021 | Li | F16H 45/02 | |
| 2021/0170854 A1* | 6/2021 | McBride | B60K 6/36 | |
| 2021/0172505 A1* | 6/2021 | Li | F16H 45/02 | |
| 2021/0237551 A1* | 8/2021 | Satyaseelan | H02K 9/19 | |
| 2021/0242750 A1* | 8/2021 | Satyaseelan | H02K 7/006 | |

* cited by examiner

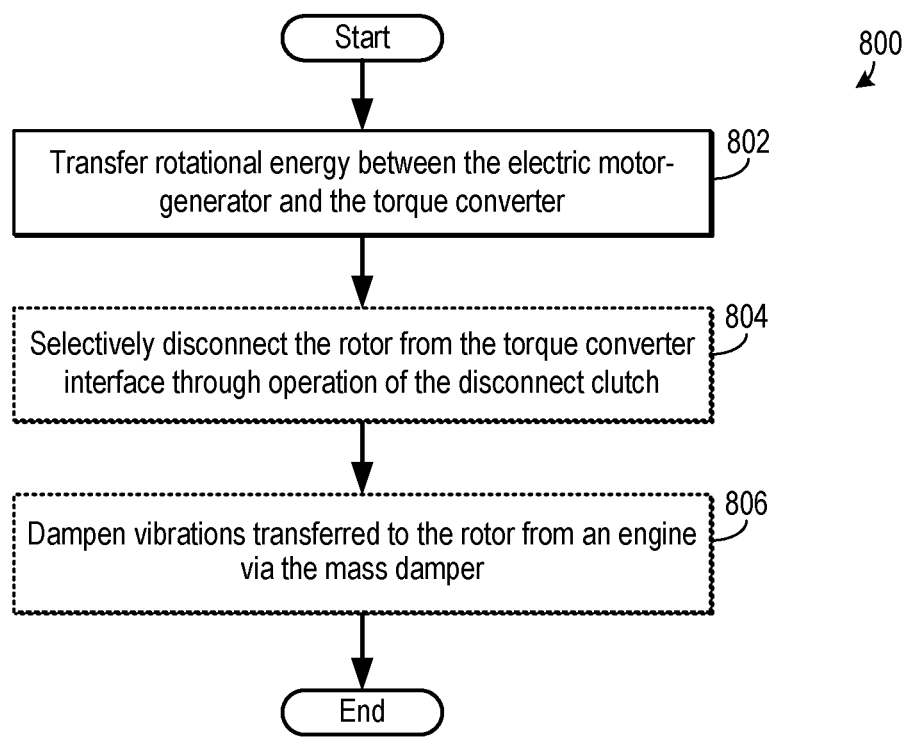

ELECTRIC MOTOR-GENERATOR IN A VEHICLE SYSTEM AND METHOD FOR OPERATION OF SAID MOTOR-GENERATOR

FIELD

The present description relates generally to an electric motor-generator in a vehicle system and a method for operation of said electric motor-generator and vehicle system.

BACKGROUND/SUMMARY

Hybrid vehicles have incorporated electric motors into various locations in vehicle drivetrains, to increase vehicle fuel economy and provide launch assist capabilities. Attempts have been made to integrate electric motors into existing drivetrain architectures. For instance, in some hybrid vehicles, clutches are positioned between the engine and the electric motor. The clutch's location enables regenerative braking efficiency gains to be achieved and also allows the electric motor to spin at higher speeds during regeneration operation, in certain situations, if desired.

One example approach of incorporating an electric motor-generator directly into an engine transmission is shown by Fujikawa et al. in U.S. Pat. No. 6,492,742 B1. Fujikawa discloses an inrunner style electric motor integrated into a torque converter. The inrunner configuration arranges the stationary stator circumferentially around a rotor spinning in an interior region bounded by the stator.

However, the inventors have recognized several issues with the inrunner style motor disclosed in Fujikawa. For instance, packaging the stator in the engine may be difficult due to the layout of the coils in the stator. Furthermore, in certain modular hybrid transmissions (MHTs) inrunner electric motors are attached to transmission torque converters. However, the attachment between the torque converter and the inrunner style motor has previously been achieved via welded joints, rivets, or other permanent mechanical attachment techniques. Consequently, the torque converter is unique to the WIT and servicing and balancing of both the motor and torque converter are difficult to carry out. Therefore, the engine and/or transmission may be redesigned to accommodate for the integration of the inrunner style motor, increasing vehicle production costs.

In one example, the issues described above may be addressed by an electric motor-generator in a vehicle. In one example, the electric motor-generator includes an engine interface configured to rotationally couple to a first engine and a transmission interface configured to rotationally couple to a first transmission of the first engine. The electric motor-generator further includes a rotor with a plurality of magnets at least partially surrounding a stator including a plurality of coils. The rotor is rotationally coupled to the engine interface and the transmission interface. In this way, an outrunner style electric motor-generator may be efficiently packaged in a vehicle system. The outrunner style motor, due to its compact design, allows the electric motor-generator to be efficiently mounted in existing transmission infrastructures, if desired, resulting in efficient vehicle transmission manufacturing and reductions in manufacturing costs of the vehicle. Positioning the rotor around the stator coils also enables the motor-generator to achieve efficiency gains when compared to inrunner style electric motors.

As one example, the electric motor-generator may further include a drop-in module removably attached to the engine interface. The drop-in module may include a disconnect clutch designed to rotationally connect and disconnect the engine interface from the transmission interface or a mass damper designed to dampen engine vibrations from an engine flexplate, in such an example. In this way, the electric motor-generator can be efficiently adapted for different vehicle designs. The drop-in module allows the electric motor-generator's modularity to be increased. The motor-generator can be consequently used on a wider variety of vehicles, if desired. The electric motor-generator's cost can therefore be reduced by leveraging the economies of scale cost advantage, if wanted.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 8 shows a method for operation of an electric motor-generator.

DETAILED DESCRIPTION

The following description relates to systems and methods for efficiently integrating an electric motor-generator into a vehicle. In one embodiment, the electric motor-generator includes a rotor attached to an engine flexplate or other suitable engine component, via an engine interface. The rotor is also attached to a transmission through a transmission interface. In what is referred to in the art as an outrunner electric motor configuration, the rotor at least partially circumferentially surrounds coils of a stator. This outrunner style electric motor-generator allows the electric motor-generator to be efficiently mounted in existing transmission infrastructures, if desired, due to its compact arrangement. Therefore, vehicle manufacturing costs can be reduced. Positioning the rotor around the stator coils also enables the motor-generator to achieve efficiency gains when compared to inrunner style electric motors. In one example, the electric motor-generator may further include a drop-in module which may include a disconnect clutch or a mass damper. The disconnect clutch functions to couple/decouple the engine from the transmission and the mass damper functions to dampen engine vibrations. The drop-in module allows the electric motor-generator to be adapted for different vehicle configurations. Consequently, manufacturing cost of the electric motor-generator may be further reduced, if desired.

Figure 1:
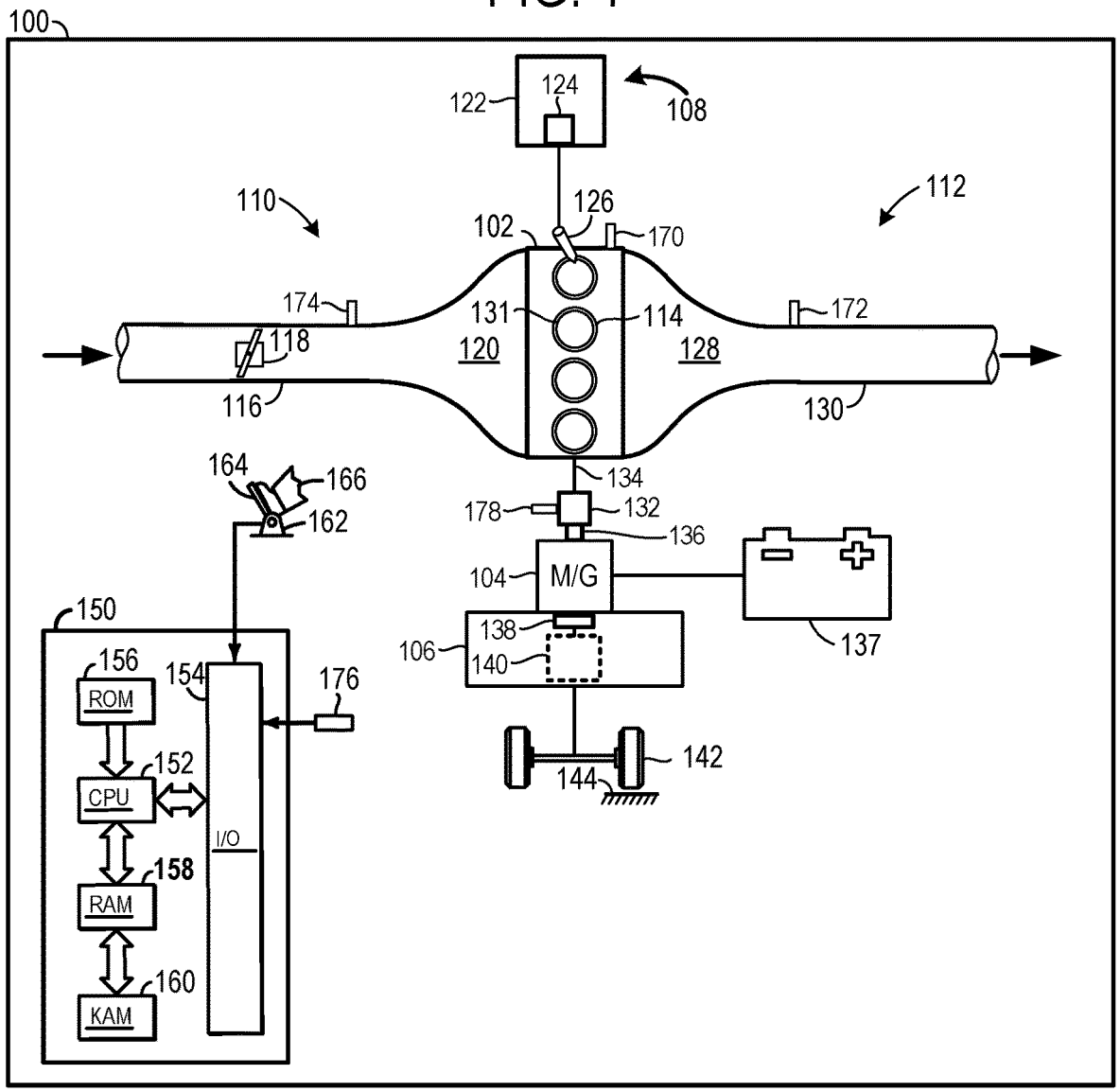
FIG. 1 is a schematic depiction of a vehicle including an engine and an electric motor-generator.

Referring now to FIG. 1, a schematic depiction of a vehicle 100 is shown. The vehicle 100 includes an engine 102, an electric motor-generator 104, and a transmission 106 receiving rotational input from the engine 102 and/or the electric motor-generator 104 depending on operating conditions. The vehicle 100 further includes a fuel delivery system 108, an intake system 110, and an exhaust system 112.

The intake system 110 provides intake air to cylinders 114 in the engine 102. During engine operation, the cylinders 114 may undergo a four-stroke cycle including an intake stroke, compression stroke, expansion stroke, and exhaust stroke. Thus, the cylinder generates motive energy for the vehicle. Although, a plurality of engine cylinders are illustrated in FIG. 1. It will be appreciated that the engine 102 may include an alternate number of cylinders, such as a single cylinder. The intake system 110 includes an intake conduit 116 and throttle 118 positioned therein to allow for adjustments in the flowrate of intake air provided to the cylinders 114. The throttle 118 may include a plate, pivot, and/or other suitable mechanical components to allow for intake airflow adjustment. The intake system 110 further includes an intake manifold 120 in fluidic communication with the cylinders 114. The intake system 110 may include intake valves (not shown) selectively providing intake air to the cylinders as well as other components enabling air to be delivered to the cylinders.

The fuel delivery system 108 is designed to deliver metered amounts of fuel to cylinders 114 in the engine 102 and includes a fuel storage tank 122 and a fuel pump 124. The fuel delivery system 108 also includes an injector 126 providing fuel to the cylinders and receiving fuel from the fuel pump 124. While a single injector is shown, injectors may be provided for each cylinder. The injector is illustrated as a direct injector in FIG. 1. However, it will be understood that port fuel injector(s) injecting fuel into the intake system upstream of the intake valves (not shown), may additionally or alternatively be included in the fuel delivery system 108.

The exhaust system 112 is designed to receive exhaust gas from the cylinders 114 through exhaust valves (not shown). The exhaust system 112 includes an exhaust manifold 128, an exhaust conduit 130, as well as other components to achieve this functionality. It will be appreciated that the exhaust manifold 128 may be in fluidic communication with exhaust valves (not shown). The exhaust system 112 may also include an emission control device (not shown) for reducing tailpipe emissions which may include catalysts, filters, combinations thereof, etc., to reduce emissions.

Pistons 131 are positioned in the cylinders 114. Reciprocal motion of the pistons 131 may be transferred to a crankshaft 132 via rods and/or other suitable mechanical components indicated at 134. The crankshaft 132 is rotationally coupled to an attachment device 136 (e.g., flexplate) designed to attach to the electric motor-generator 104. The attachment device 136 serves as a mounting point for the electric motor-generator 104. In other examples, the attachment device may be a flywheel. In such an example, the flywheel may be designed to store rotational energy during certain operating conditions as well as serve as a mounting point for the electric motor-generator 104.

In one example, the engine 102 may further include an ignition system (not shown) configured to provide spark to the cylinders 114 via an ignition device (e.g., spark plug) at desired time intervals. Additionally or alternatively, the engine 102 may perform compression ignition in the cylinders 114.

The electric motor-generator 104 is designed to deliver rotational energy to a transmission 106 and receive energy from the engine 102. The electric motor-generator 104 is configured to transfer energy to and receive energy from an energy storage device 137 (e.g., battery, capacitor, combinations thereof, etc.) via wired and/or wireless energy transfer. The functionality and structural design of the electric motor-generator 104 is described in greater detail herein with regard to FIGS. 2-7. The electric motor-generator 104 is schematically depicted in FIG. 1. However, it will be understood that the electric motor-generator 104 has greater structural complexity expanded upon in regard to FIGS. 2-7.

The electric motor-generator 104 is also designed to transfer rotational energy to the transmission 106 by way of an attachment component 138 (e.g., torque converter). Thus, the attachment component 138 may serve as an interface for rotational energy transfer and mechanical attachment. In one example, a set of gears (e.g., a plurality of discrete gears, continuously variable gears, etc.) may be included in the transmission 106. The gearing allows the rotational speed of the downstream components (e.g., axles, drive wheels, differentials, etc.) to be varied. Thus, the transmission 106 may transfer motive power to drive wheels 142. In turn, the drive wheels 142 contact a driving surface 144, enabling the vehicle to travel along a desired path. It will be appreciated that the electric motor-generator 104 may be integrated into two or four wheel drive transmissions. Additionally, the transmission 106 may be an automatic transmission where gear ratios are automatically selected during vehicle operation, in one example.

The vehicle 100 shown in FIG. 1 is a hybrid vehicle with multiple sources of torque available to the drive wheels 142. The powertrain is specifically shown in a parallel style hybrid configuration. However, other hybrid vehicle configurations have been contemplated. In one example, the vehicle 100 includes a disconnect clutch in the electric motor-generator 104 configured to rotationally connect/disconnect the engine 102 from the transmission 106. The transmission 106 may include a gearbox 140, planetary gears, and/or other suitable gearing components, enabling a gear ratio (e.g., drive gear) of the vehicle to be selected. When the transmission includes a gearbox a plurality of discrete gears may be selectable. However, in the case of a continuously variable transmission, a continuous range of gear ratios may be available in the transmission.

FIG. 1 also shows a controller 150 in the vehicle 100. Specifically, controller 150 is shown in FIG. 1 as a conventional microcomputer including: microprocessor unit 152, input/output ports 154, read-only memory 156, random access memory 158, keep alive memory 160, and a conventional data bus. Controller 150 is configured to receive various signals from sensors coupled to the engine 102. The sensors may include engine coolant temperature sensor 170, exhaust gas sensors 172, an intake airflow sensor 174, ambient temperature sensor 176, engine speed sensor 178, etc. Additionally, the controller 150 is also configured to receive a pedal position from a pedal position sensor 162 coupled to a pedal 164 actuated by an operator 166. The pedal adjustment may trigger corresponding adjustment to the position of the throttle 118.

The controller 150 may be configured to trigger one or more actuators and/or send commands to components. For instance, the controller 150 may trigger adjustment of the throttle 118, the electric motor-generator 104, the transmission 106, and the fuel delivery system 108. For instance, the controller may send a command signal to the throttle to adjust an actuator therein causing movement (e.g., rotation) of a throttle plate. The other components receiving command signals from the controller may function in a similar manner. Therefore, the controller 150 receives signals from the various sensors and employs various actuators to adjust engine operation based on the received signals and instructions stored in memory of the controller.

The controller 150 may be configured to place the electric motor-generator 104 into various modes, such as a regeneration mode where the energy storage device 137 is recharged by the motor-generator capturing kinetic energy from the vehicle. In an assist mode, the motor-generator 104 provides rotational energy to the transmission 106 to provide motive power to the drive wheels 142. The electric motor-generator 104 therefore allows the vehicle to achieve increased fuel economy and launch assist capabilities.

Figure 2:
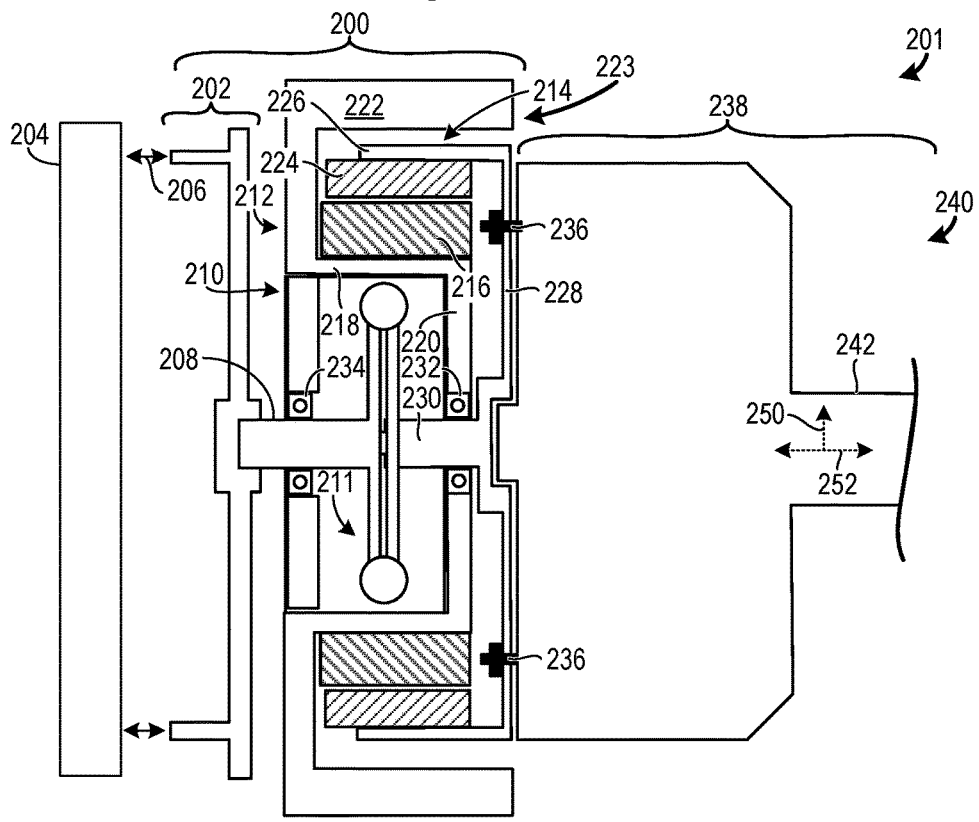
FIG. 2 is a cross-sectional illustration of a vehicle system including an electric motor-generator coupled to an engine and transmission.

FIG. 2 shows a detailed view of an example of an electric motor-generator 200 in a vehicle system 201. The electric motor-generator 200, shown in FIG. 2, is an example of the electric motor-generator 104, shown in FIG. 1. As such, the electric motor-generators may share common structural as well as functional features. For instance, the electric motor-generator 200, shown in FIG. 2, may be included in a vehicle such as the vehicle 100, shown in FIG. 1. The electric motor-generator 200 and vehicle system 201 are shown in cross-section. The cutting plane for the cross-sectional view of FIG. 2 and the other cross-sectional views (FIGS. 3-7) is a plane extending through the rotational axis of the system. As such, the cutting plane is radially aligned.

The electric motor-generator 200 includes an engine interface 202 (e.g., flexplate adapter) rotationally coupled to an engine component 204. The attachment between the motor-generator and the engine component is indicated via arrows 206. For instance, the engine interface 202 may be coupled to a flexplate via suitable attachment apparatuses (e.g., bolts, welds, clamps, combinations thereof, etc.). It will be understood that the engine component 204 may be a component in the engine 102, shown in FIG. 1.

The engine interface 202 is rotationally coupled to a module shaft 208 of a drop-in module 210. The drop-in module 210 may take several forms such as a clutch, damper, or non-dampened shaft. In this way, the modularity of the electric motor-generator may be increased. In the specific embodiment shown in FIG. 2, the drop-in module 210 includes a mass damper 211. The mass damper 211 functions to dampen vibrations transferred to the electric motor-generator 200 from the engine. The mass damper along with other embodiments of the drop-in module are discussed in greater detail herein with regard to FIGS. 4-6.

The electric motor-generator 200 includes a stator 212 and a rotor 214. The stator 212 includes a plurality of coils 216 (e.g., field windings). The coils 216 are configured to receive electrical energy from an energy storage device (e.g., a battery) during an assist mode (e.g., boosting mode) of the electric motor-generator 200 where the motor-generator provides motive power to the transmission. Thus, electrical conduits, wireless energy transfer devices, etc., may allow the energy to be transferred between the motor-generator and the battery. The coils 216 are also configured to transfer electrical energy to the energy storage device during a regeneration mode where the electric motor-generator 200 is producing electrical energy. For instance, in the regeneration mode the motor-generator may recover energy by slowing the vehicle. The coils may include a suitable metal such as steel and/or aluminum. The coils 216 are positioned on a coil carrier 218. The coil carrier 218 extends in an axial direction, in the illustrated example. A radial direction 250 and a rotational axis 252 are provided in FIG. 2 as well as FIGS. 3-7 for reference. It will be understood that a radial direction is any direction perpendicular to the rotational axis 252. Furthermore, the rotational axis 252 denotes the axis about which the components of the vehicle system 201 rotate. Additionally, in the illustrated example, the stator 212 includes radial extensions 220. However, other stator contours have been envisioned.

The stator 212 may remain substantially stationary with regard to rotation during operation of the motor-generator. To allow the stator to remain substantially rotationally stationary, the stator 212 further includes mounting extensions 222 extending radial outward from the coil carrier 218. The mounting extensions 222 each include an end 223 configured to attach to a housing of a torque converter or other suitable component in the transmission functioning as a point of attachment. To elaborate, the mounting extensions 222 extend radially outward from magnets 224 (e.g., permanent magnets) in the rotor 214 and may be removably attached to the torque converter via attachment devices (e.g., bolts, clamps, welds, and the like). It will be appreciated that the magnets may include magnetized metal, in one example. The mounting extensions 222 allow the electric motor-generator to be compactly integrated into the drivetrain. As a result, the packaging efficiency of the motor-generator may be increased, if desired. The mounting extensions 222 also allow a stator cooling path to be established where heat is transferred to the torque converter housing and then dissipated. In this way, the stator's operating temperature may be reduced, thereby increasing motor-generator efficiency.

Electromagnetic interaction between the coils 216 of the stator 212 and the magnets 224 of the rotor 214 allow for rotational energy transfer between the electric motor-generator 200 and the engine as well as the transmission. Consequently, the electric motor-generator 200 can carry out various hybrid vehicle functions such as launch assist, energy regeneration, drive assist, etc., to increase the range and/or fuel economy of the vehicle.

The magnets 224 of the rotor 214 at least partially circumferentially surround the coils 216 of the stator 212. Arranging the stator and rotor in this manner is referred to, in the art, as an outrunner motor configuration. The outrunner configuration of the electric motor-generator provide several benefits such as increasing the motor-generator's efficiency when compared to inrunner style motors. The outrunner arrangement of the motor-generator also allows the motor-generator to achieve a more compact arrangement when compared to inrunner style motors due to the packaging of the coils, for example. Additionally, when an outrunner motor design is utilized in the vehicle system, the diameter of the rotor may be large enough to allow attachment mechanisms (e.g., removable attachment mechanisms such as studs, bolts, etc.) having a desirable attachment strength to be used. Consequently, the outrunner style motor may not require a unique torque converter from a base transmission (e.g., base automatic transmission), resulting in a simplified drivetrain design and reduced manufacturing costs, if desired. Furthermore, using an outrunner style motor can also allow parts in the motor to be separately balanced and serviced, if desired.

The magnets 224 of the rotor 214 are mounted on a rotor carrier 226. The rotor carrier 226 extends in an axial direction from a rotor plate 228 mounted to a rotor shaft 230. A bearing 232 in the stator 212 and a bearing 234 in the drop-in module 210 enable rotation of the rotor 214 and specifically the rotor shaft 230. The bearings 232 and 234 may include races, roller elements (e.g., balls, cylinders, and the like), etc., to allow for rotation of the shaft 230. Specifically, an inner race of each of the bearings may be in face sharing contact with outer surfaces of the rotor and module shafts. However, additional or alternative coupling techniques between the shaft and bearings have been envisioned. Providing one bearing in the stator and another in the drop-in module allows the drop-in module to be efficiently assembled in the electric motor-generator during production of the vehicle system. Consequently, production costs of the vehicle system can be further reduced.

Attachment devices 236 are shown attaching the rotor 214 and specifically the rotor plate 228 to a torque converter 238 in a transmission 240. In one example, the rotor plate 228 may be attached to a turbine plate in the torque converter 238. In this way, the rotor 214 may transfer rotational energy to the torque converter 238 and then to the transmission via an output shaft 242.

Figure 3:
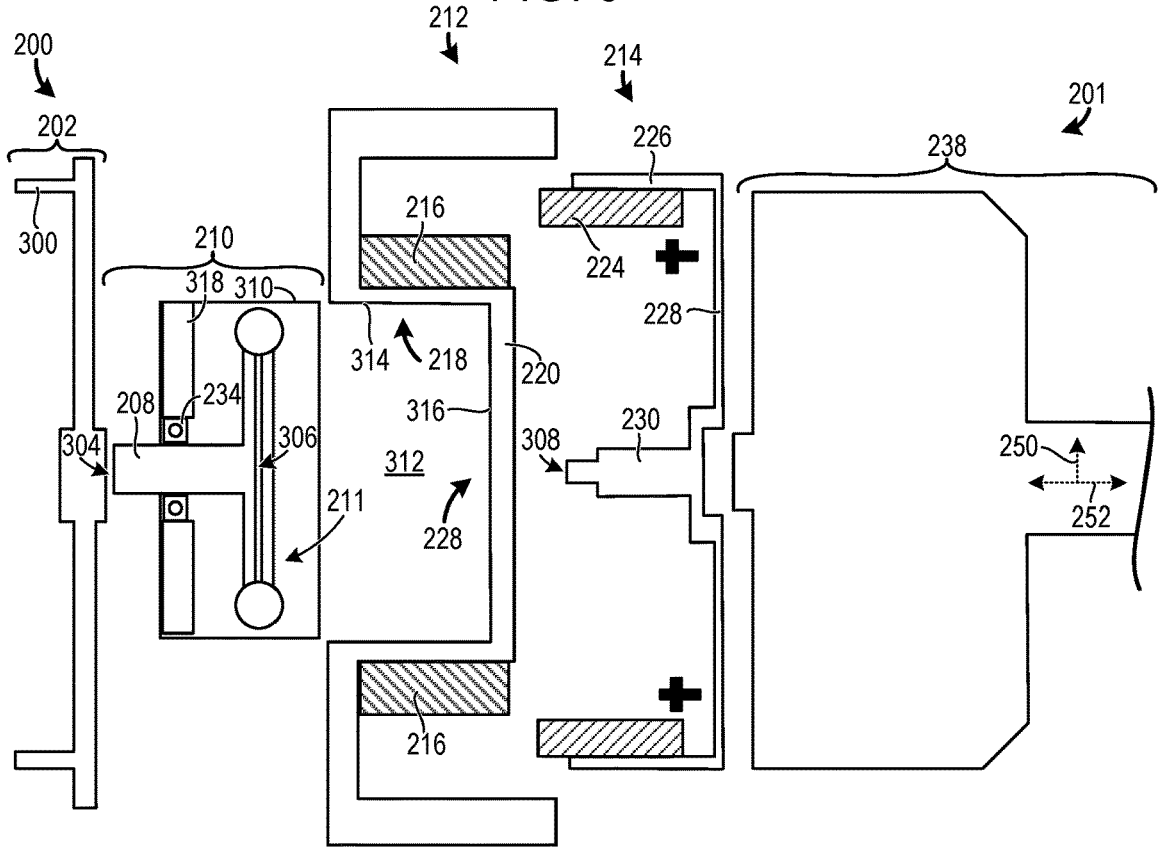
FIG. 3 is an exploded view of the vehicle system, shown in FIG. 2.

FIG. 3 shows an exploded view of the vehicle system 201 with the electric motor-generator 200. The engine interface 202 (e.g., flexplate adapter), drop-in module 210, stator 212, rotor 214, and torque converter 238 are again illustrated. The engine interface 202 includes extensions 300 that may mate with recesses in an engine flexplate. However, additional or alternative coupling techniques between the engine interface and the engine may be used, in other examples.

The drop-in module 210 includes a mass damper 211. The mass damper 211 rotates on a module shaft 208. When the electric motor-generator 200 is assembled, the module shaft 208 is coupled to the engine interface 202 at one end 304. At a second end 306, the module shaft 208 is coupled to an end 308 of the rotor shaft 230. The shaft attachment at either end may be carried out via suitable attachment techniques such as attachment devices (e.g., bolts, screws, and the like), welds, clamps, etc. A housing 310 of the drop-in module 210 is sized to fit within an interior opening 312 in the stator 212. However, in other examples the housing may be omitted from the drop-in module. The interior opening 312 of the stator 212 is at least partially demarcated by an interior surface 314 of the coil carrier 218 and surfaces 316 of the radial extensions 220. The drop-in module 210 may further include a mounting section 318 radially extending from the bearing 234 (e.g., outer races of the bearing). The mounting section 318 may be attached to the coil carrier 218 to allow the drop-in module to be secured in a desired location. However, other suitable module mounting techniques have been envisioned.

FIG. 3 also shows the radial extensions 222 of the stator 212. The magnets 224 of the rotor 214 as well as the rotor carrier 226 and the rotor plate 228 are again shown in FIG. 3. As previously mentioned, the rotor carrier 226 and the magnets 224 at least partially circumferentially surround the stator coils 216.

Figure 4:
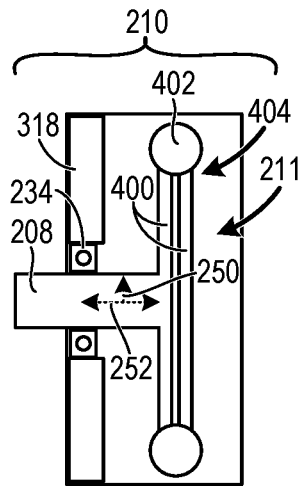
FIGS. 4-6 show different embodiments of a drop-in module included in the electric motor-generator, shown in FIGS. 2-3.
Figure 5:
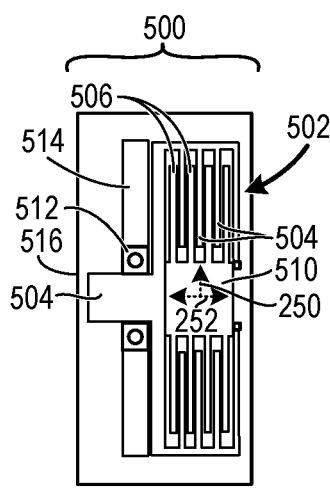
Figure 6:
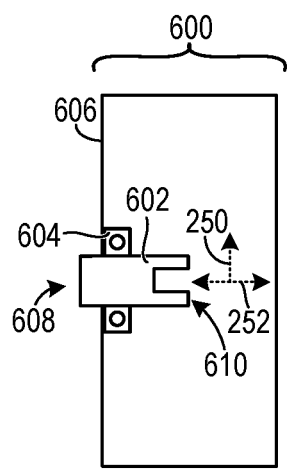
Figure 7:
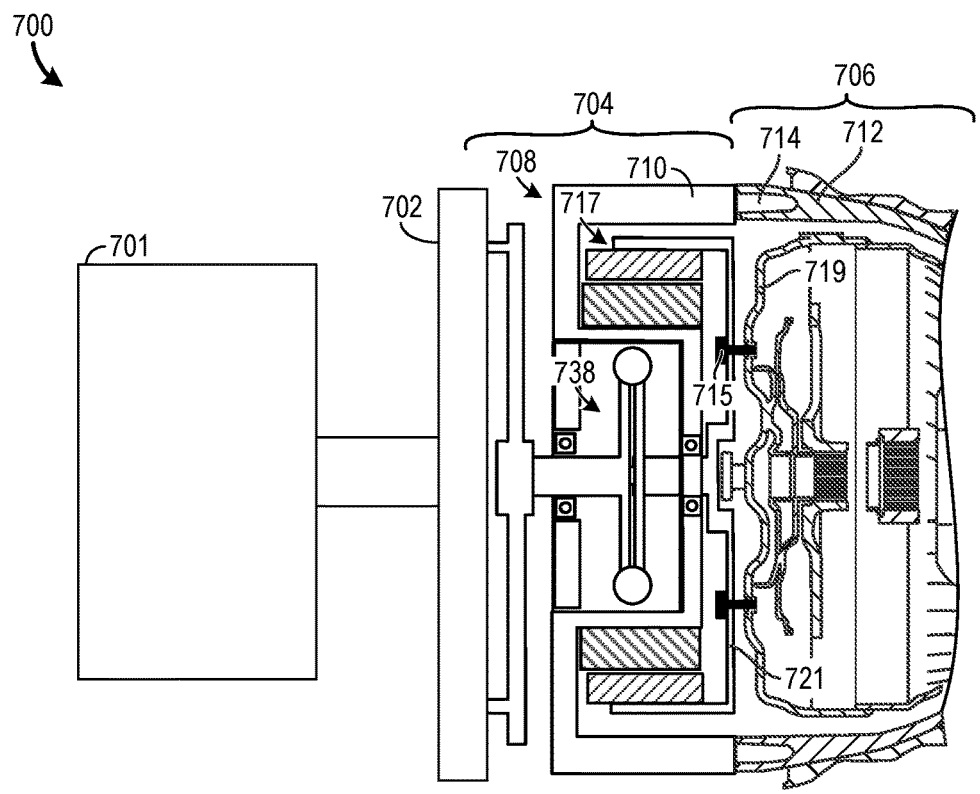
FIG. 7 shows an engine line including different torque converters with similar electric motor-generators attached to each of the torque converters.
Figure 7:
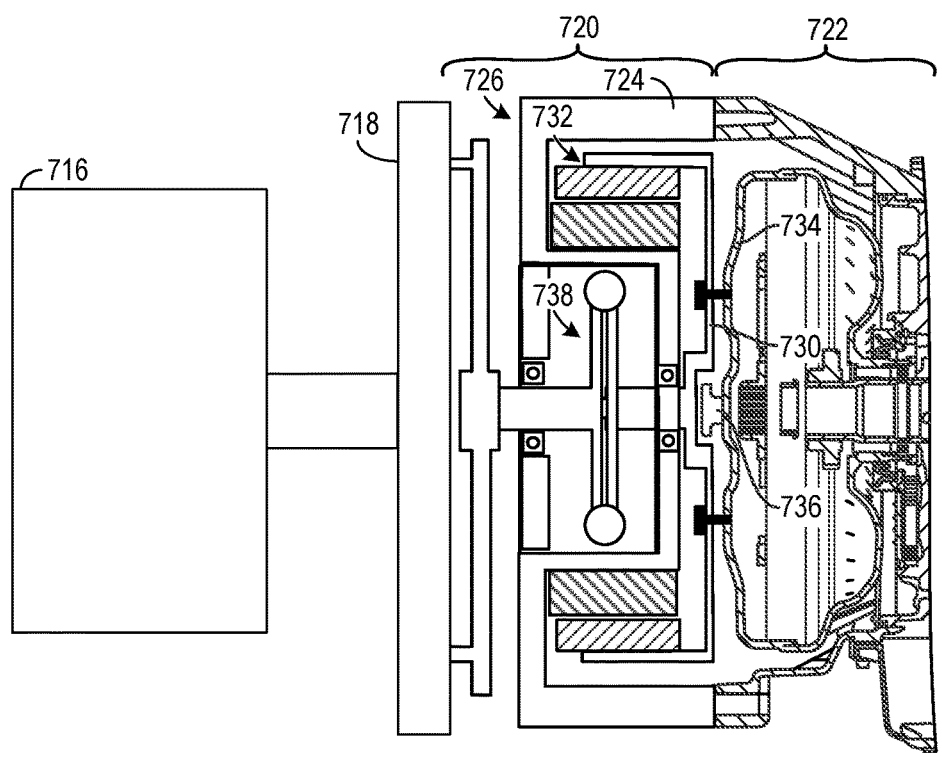

FIGS. 4-6 illustrate different embodiments of a drop-in module which can be deployed in the electric motor-generators described herein (e.g., the electric motor-generator 200 shown in FIGS. 2-3 or the electric motor-generators 704 and 720 shown in FIG. 7, described in greater detail herein).

Turning to FIG. 4 illustrating the drop-in module 210 with the mass damper 211. The mass damper 211 includes carrier extensions 400 protruding from the module shaft 208. Dampening masses 402 are arranged on distal ends 404 of the carrier extensions 400. However, in other configurations, a carrier plate substantially circumferentially surrounding the module shaft 208. The dampening masses 402 may be weighted and sized to attenuate vibrations originating in the engine and propagating to the motor-generator from the flexplate. The tuning of the mass dampening properties may therefore depend on the engine's design such as the cylinder arrangement, ignition timing, cylinder displacement, crankshaft profile, etc. The bearing 234 and the mounting extensions 318 extending therefrom are also illustrated in FIG. 4.

Referring to FIG. 5 depicting a drop-in module 500 with a disconnect clutch 502. The disconnect clutch 502 is configured to rotationally couple/decouple an engine attachment device (e.g., flexplate) from a transmission component (e.g., torque converter), such as the attachment device 136 and the attachment component 138, shown in FIG. 1.

The disconnect clutch 502 includes a first set of plates 504 rotationally coupled to an input shaft 506 and a second set of plates 508 rotationally coupled to an output shaft 510. The first set of plates 504 and the second set of plates 508 may function as friction plates to connect and disconnect the input shaft 506 from the output shaft 510. In this way, the engine's flexplate may connected/disconnected from the torque converter. The disconnect clutch 502 may be electrically actuated, in one example. However, in other examples, hydraulic clutch actuation may be employed to change the configuration of the disconnect clutch. In another example, a mechanical one-way or selectable one-way clutch can also be used. The drop-in module 500 again includes a bearing 512, a mounting section 514, and a housing 516.

Now turning to FIG. 6 showing a drop-in module 600 with a non-dampened shaft 602. A bearing 604 allows the shaft 602 to rotate. The bearing 604 is coupled to a housing 606. A first end 608 of the shaft 602 is designed to attach to a flexplate or other suitable engine components. A second end 610 of the shaft 602 is designed to attach to an end of a rotor shaft, such as the end 308 of the rotor shaft 230 shown in FIG. 3. In this way, rotationally energy from the flexplate may be transferred to the drop-in module shaft and then to the rotor.

FIG. 7 illustrates an engine line 700 including a first engine 701 with a first flexplate 702 coupled to a first electric motor-generator 704. The first engine 701 as well as the other engines shown in FIG. 7 are schematically depicted. However, it will be understood that the engines may have additional structural complexity and include components such as cylinders, crankshafts, etc., designed to implement combustion operation. The engines shown in FIG. 7 therefore may include at least a portion of the engine components described above with regard to FIG. 1. The first electric motor-generator 704 is also coupled to a first torque converter 706. To elaborate, the stator 708 of the electric motor-generator 704 includes mounting extensions 710 attached to a housing 712 of the first torque converter 706. Recesses 714 in the housing 712 enable the attachment between the mounting extensions 710 and the first torque converter 706 via attachment devices, such as bolts. However, other attachment techniques may used in other embodiments. Attachment devices 715 are shown attaching a rotor plate 721 of the rotor 717 to a plate 719 in the first torque converter 706.

In one example, the first and second torque converters 706 and 722 and/or the first and/or flexplates 702 and 718 may not be substantially modified to allow the electric motor-generators to be attached thereto. In this way, the electric motor-generators can be efficiently incorporated into existing drivetrain architectures, in one example, if desired. However, in other examples modification of the torque converters and/or flexplates may occur to allow the motor-generator to be attached thereto. The second flexplate 718 and the second torque converter 722 are discussed in greater detail herein.

Further, in one example, the transmissions including the torque converters 706 and 722 may be assembled and tested prior to attaching the motor-generators thereto due to ability of the motor-generator to efficiently attach to the transmission. Consequently, the vehicle system's production costs can be further reduced, if desired. Additionally, in some examples, the torque converter may be balanced separately from the balancing of the electric motor-generator due to the ability of the motor-generator to be efficiently attached to the transmission and the compact arrangement of the motor-generator. Consequently, vehicle costs can be further reduced.

It will be understood, that rotational energy may be transferred from the first engine 701 to the first electric motor-generator 704 and then to the first torque converter 706. The first electric motor-generator 704 may also transfer energy to the first torque converter 706 during an assist mode and receive energy from the first engine 701 during a regeneration mode. A second engine 716 and associated components may have a similar functionality.

The engine line 700 further includes the second engine 716 with the second flexplate 718 coupled to a second electric motor-generator 720. The second electric motor-generator 720 is also coupled to the second torque converter 722. Mounting extensions 724 in a stator 726 of the second electric motor-generator 720 are attached to a housing 728 of the second torque converter 722. Additionally, a rotor plate 730 in a rotor 732 of the second electric motor-generator 720 is attached to a rotational plate 734 rotating about a shaft 736 in the second torque converter 722. The first engine 701 and corresponding first torque converter 706 are different in size and/or configuration from the second engine 716 and corresponding second torque converter 722. For instance, the first and second engines may have different compression ratios. To elaborate, the first engine 701 may have a greater compression ratio than the second engine 716.

Furthermore, the first and second torque converters 706 and 722 may have different torque transfer characteristics but a similar mounting arrangement. However, the first and second electric motor-generators 704 and 720, may be substantially identical in size, layout, and functionality. In this way, a common electric motor-generator design can be used for two different engines and corresponding transmission systems. Consequently, production cost of the engine line 700 is reduced. Although, the electric motor-generators 704 and 720 each have a mass damper 738 in the drop-in modules, other embodiments of the drop-in modules have been envisioned. For instance, the first electric motor-generator 704 may include the disconnect clutch 502, shown in FIG. 5, while the second electric motor-generator 720 may include a non-dampened drop-in module, such as the drop-in module 600, illustrated in FIG. 6. In this way, the motor generators can be adapted for different end-use operating environments, enabling augmentation of the electric motor-generator's functionality at a late state in the production process, if desired. Further production cost reductions can be leveraged as a result of the production adaptation.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as being in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 8 shows a method 800 for operation of an electric motor-generator. The method 800 may be carried out by the electric motor-generators and the vehicle systems described above with regard to FIGS. 1-7. However, in other examples, the method 800 may be implemented via other suitable electric motor-generators and/or vehicle systems. The method 800 may be stored in non-transitory memory of a controller. Furthermore, the method 800 may include instructions within a controller as well actions taken by the controller. It will also be understood that the method 800 may include at least some steps that are at least partially passively implemented, such as step 806.

At 802, the method includes transferring rotational energy between the electric motor-generator and the torque converter. For instance, the electric motor-generator may receive rotational energy from the engine by way of a flexplate or transfer rotational energy to a transmission by way of a torque converter, for example. In this way, the electric motor-generator may be operated in a drive mode where the device provides motive power to the vehicle or in a generator mode where the device generates electrical energy for energy storage.

When the drop-in module includes a disconnect clutch, the method includes step 804. At 804 the method may include selectively disconnecting the rotor from the torque converter interface through operation of the disconnect clutch.

When the drop-in module includes a mass damper the method includes step 806. At 806, the method may include dampening vibrations transferred to the rotor from an engine via the mass damper. In this way, NVH may be reduced in the vehicle system. Method 800 allows the outrunner style motor-generator to be efficiently operated in the vehicle system to increase vehicle fuel economy.

The technical effect of providing an electric motor-generator in a vehicle system that includes a rotor with magnets at least partially surrounding coils of a stator is an efficient and compact motor-generator arrangement that is adaptable for a variety of engine configurations. Consequently, the production costs of the electric motor-generator and vehicle system can be reduced.

The invention will be further described in the following paragraphs. In one aspect, an electric motor-generator is provided that comprises an engine interface configured to rotationally couple to a first engine; a transmission interface configured to rotationally couple to a first transmission of the first engine; and a rotor with a plurality of magnets at least partially surrounding a stator including a plurality of coils; where the rotor is rotationally coupled to the engine interface and the transmission interface.

In another aspect, a method for operation of an electric motor-generator is provided that comprises transferring rotational energy between the electric motor-generator and a first torque converter; where the electric motor-generator is configured to rotationally couple to a first engine and a first torque converter and comprises: a rotor with a plurality of magnets at least partially surrounding a stator including a plurality of coils; and where the rotor is rotationally coupled to the first engine and the first torque converter. In a first example, the method may further comprise selectively disconnecting the rotor from the torque converter interface through operation of a disconnect clutch in a drop-in module rotationally coupled to the engine interface and a rotational shaft of the rotor. In a second example, the method may further comprise
dampening vibrations transferred to the rotor from an engine via a mass damper included in a drop-in module rotationally coupled to the engine interface and a rotational shaft of the rotor. In a third example, transferring rotational energy between the electric motor-generator and the torque converter may include providing rotational energy to and receiving rotational energy from the torque converter.

In another aspect, an outrunner electric motor-generator is provided that comprises a flexplate adapter configured to rotationally attach to a first flexplate in a first engine; a torque converter interface configured to rotationally attach to a first torque converter in a first transmission; and a rotor with a plurality of magnets at least partially surrounding a stator including a plurality of coils; where the rotor is rotationally coupled to the flexplate interface and the torque converter interface.

In any of the aspects or combinations of the aspects, the electric motor-generator may further comprise a drop-in module removably attached to the engine interface; where the drop-in module includes a bearing attached to the stator and configured to permit rotation of the rotor.

In any of the aspects or combinations of the aspects, the drop-in module may include a disconnect clutch designed to rotationally connect and disconnect the engine interface from the transmission interface.

In any of the aspects or combinations of the aspects, the drop-in module may include a mass damper designed to dampen engine vibrations from an engine flexplate.

In any of the aspects or combinations of the aspects, the mass damper may be at least partially circumferentially surrounded by the plurality of magnets in the rotor.

In any of the aspects or combinations of the aspects, the engine interface may be a flexplate adapter.

In any of the aspects or combinations of the aspects, the transmission interface may be coupled to a rotational shaft in a torque converter.

In any of the aspects or combinations of the aspects, the stator may include a mounting extension radially extending outward from the rotor and attached to a housing of a torque converter.

In any of the aspects or combinations of the aspects, the electric motor-generator may be included in an engine line that may comprise: the first engine having a first compression ratio, where the engine interface is configured to attach to a first flexplate in the first engine and the transmission interface is configured to attach to a first torque converter included in the first transmission; and a second engine having a second compression ratio different from the first compression ratio, where the engine interface is configured to attach to a second flexplate in the second engine and the transmission interface is configured to attach to a second torque converter included in the second engine.

In any of the aspects or combinations of the aspects, the electric motor-generator may further comprise a drop-in module removably attached to the flexplate adapter; where the drop-in module includes a bearing attached to the stator and configured to enable rotation of the rotor.

In any of the aspects or combinations of the aspects, the drop-in module may include a disconnect clutch designed to rotationally connect and disconnect the flexplate adapter from the torque converter interface; or a mass damper designed to dampen engine vibrations from the first flexplate.

In any of the aspects or combinations of the aspects, the drop-in module may be at least partially circumferentially surrounded by the plurality of magnets in the rotor.

In any of the aspects or combinations of the aspects, the stator may include a mounting extension radially extending outward from the rotor and attached to a housing of a torque converter.

In any of the aspects or combinations of the aspects, the stator may include a mounting extension radially extending outward from the rotor and attached to a housing of the torque converter.

In any of the aspects or combinations of the aspects, the outrunner electric motor-generator may be included in an engine line that may comprise the first engine having a first compression ratio; and a second engine having a second compression ratio different from the first compression ratio, where the flexplate interface is configured to attach to a second flexplate in the second engine and the torque converter interface is configured to attach to a second torque converter included in the second engine.

In any of the aspects or combinations of the aspects, the transmission system may be included in a hybrid vehicle.

In any of the aspects or combinations of the aspects, the where the mounting extension may be removably mechanically attached to the housing.

In another representation, an outrunner motor-generator in a vehicle drivetrain is provided that comprises a rotor circumferentially surrounding a stator and a drop-in module removably attached to the stator and including a bearing rotationally interfacing with a rotational shaft of the rotor and where the drop-in module is rotationally coupled to an engine flexplate and where the rotor is rotationally coupled to a torque converter in a transmission.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "substantially" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric motor-generator, comprising:
an engine interface configured to rotationally couple to a first engine;
a transmission interface configured to rotationally couple to a first transmission of the first engine;
a rotor with a plurality of magnets at least partially surrounding a stator including a plurality of coils;
where the rotor is rotationally coupled to the engine interface and the transmission interface; and
a drop-in module removably attached to the engine interface, where the drop-in module includes a bearing attached to the stator and configured to permit rotation of the rotor.

2. The electric motor-generator of claim 1, where the drop-in module includes a disconnect clutch designed to rotationally connect and disconnect the engine interface from the transmission interface.

3. The electric motor-generator of claim 1, where the drop-in module includes a mass damper designed to dampen engine vibrations from an engine flexplate.

4. The electric motor-generator of claim 3, where the mass damper is at least partially circumferentially surrounded by the plurality of magnets in the rotor.

5. The electric motor-generator of claim 1, where the engine interface is a flexplate adapter.

6. The electric motor-generator of claim 1, where the transmission interface is coupled to a rotational shaft in a torque converter.

7. The electric motor-generator of claim 1, where the stator includes a mounting extension radially extending outward from the rotor and attached to a housing of a torque converter.

8. An electric motor-generator, comprising:
an engine interface configured to rotationally couple to a first engine;
a transmission interface configured to rotationally couple to a first transmission of the first engine; and
a rotor with a plurality of magnets at least partially surrounding a stator including a plurality of coils;
where the rotor is rotationally coupled to the engine interface and the transmission interface, and where the electric motor-generator is included in an engine line comprising:
the first engine having a first compression ratio, where the engine interface is configured to attach to a first flexplate in the first engine and the transmission interface is configured to attach to a first torque converter included in the first transmission; and
a second engine having a second compression ratio different from the first compression ratio, where the engine interface is configured to attach to a second flexplate in the second engine and the transmission interface is configured to attach to a second torque converter included in the second engine.

9. An outrunner electric motor-generator, comprising:
a flexplate adapter configured to rotationally attach to a first flexplate in a first engine;
a torque converter interface configured to rotationally attach to a first torque converter in a first transmission;
a rotor with a plurality of magnets at least partially surrounding a stator including a plurality of coils;
where the rotor is rotationally coupled to the flexplate interface and the torque converter interface; and
a drop-in module removably attached to the flexplate adapter, where the drop-in module includes a bearing attached to the stator and configured to enable rotation of the rotor.

10. The outrunner electric motor-generator of claim 9, where the drop-in module includes:
a disconnect clutch designed to rotationally connect and disconnect the flexplate adapter from the torque converter interface; or
a mass damper designed to dampen engine vibrations from the first flexplate.

11. The outrunner electric motor-generator of claim 10, where the drop-in module is at least partially circumferentially surrounded by the plurality of magnets in the rotor.

12. The outrunner electric motor-generator of claim 9, where the stator includes a mounting extension radially extending outward from the rotor and attached to a housing of a torque converter.

13. The outrunner electric motor-generator of claim 12, where the mounting extension is removably mechanically attached to the housing.

14. The outrunner electric motor-generator of claim 9, where the outrunner electric motor-generator is included in an engine line comprising:
the first engine having a first compression ratio; and
a second engine having a second compression ratio different from the first compression ratio, where the flexplate interface is configured to attach to a second flexplate in the second engine and the torque converter interface is configured to attach to a second torque converter included in the second engine.

* * * * *